United States Patent
Falk et al.

(10) Patent No.: US 9,917,443 B2
(45) Date of Patent: *Mar. 13, 2018

(54) PHOTOVOLTAIC SYSTEM AND METHOD FOR OPERATING A PHOTOVOLTAIC SYSTEM FOR FEEDING ELECTRICAL POWER INTO A MEDIUM-VOLTAGE NETWORK

(71) Applicants: SMA Solar Technology AG, Niestetal (DE); Adensis GmbH, Dresden (DE)

(72) Inventors: Andreas Falk, Kassel (DE); Bernhard Beck, Volkbach-Dimbach (DE); Aaron Philipp Gerdemann, Kassel (DE); Frank Niebling, Kaufungen (DE)

(73) Assignees: SMA Solar Technology AG, Neubiberg (DE); Adensis GmbH, Dresden (DE)

( * ) Notice: Subject to any disclaimer, the term of this patent is extended or adjusted under 35 U.S.C. 154(b) by 651 days.

This patent is subject to a terminal disclaimer.

(21) Appl. No.: 14/535,462

(22) Filed: Nov. 7, 2014

(65) Prior Publication Data

US 2015/0069841 A1   Mar. 12, 2015

Related U.S. Application Data

(63) Continuation of application No. PCT/EP2013/058864, filed on Apr. 29, 2013.

(30) Foreign Application Priority Data

May 7, 2012  (DE) .......................... 10 2012 104 005

(51) Int. Cl.
*H02J 3/38* (2006.01)
*H02M 7/5387* (2007.01)

(52) U.S. Cl.
CPC ................ *H02J 3/38* (2013.01); *H02J 3/383* (2013.01); *H02M 7/53871* (2013.01); *Y02E 10/563* (2013.01); *Y10T 307/609* (2015.04)

(58) Field of Classification Search
CPC ........ H02J 3/38; H02J 3/383; H02M 7/53871; Y10T 307/609; Y02E 10/563
See application file for complete search history.

(56) References Cited

U.S. PATENT DOCUMENTS

| 4,481,378 A | 11/1984 | Lesk |
| 6,219,623 B1 * | 4/2001 | Wills ...................... H02J 3/383 290/40 B |

(Continued)

FOREIGN PATENT DOCUMENTS

| DE | 3236071 A1 | 1/1984 |
| DE | 202009018199 U1 | 6/2011 |
| EP | 2190110 A1 | 5/2010 |

OTHER PUBLICATIONS

Anonymous: "PV Grid Intergration" Apr. 1, 2012. Retrieved from http://files.sma.de/dl/10040/PV-Netzint-ADE123016w.pdf.

(Continued)

*Primary Examiner* — Jared Fureman
*Assistant Examiner* — Michael Warmflash
(74) *Attorney, Agent, or Firm* — Eschweiler & Potashnik, LLC

(57) ABSTRACT

The disclosure relates to a method for operating a photovoltaic system for feeding a medium-voltage grid, wherein the photovoltaic system has a photovoltaic generator including a plurality of photovoltaic modules, at least one inverter and at least one medium-voltage transformer. The medium-voltage transformer is connected on the primary side directly to a low-voltage AC output of the inverter, the inverter is connected to the photovoltaic generator via a DC input, and the inverter permits reverse currents from the low-voltage (Continued)

AC output to the DC input. The method is characterized by the fact that in the event that there is insufficient generation of electric power for the feed by the photovoltaic modules, the inverter remains connected on the AC side to the medium-voltage grid via the medium-voltage transformer, and remains connected on the DC side to the photovoltaic generator.

18 Claims, 3 Drawing Sheets

(56) References Cited

U.S. PATENT DOCUMENTS

| | | | |
|---|---|---|---|
| 6,339,538 B1* | 1/2002 | Handleman | G05F 1/67 136/293 |
| 9,525,287 B2* | 12/2016 | Falk | H02J 3/383 |
| 9,537,319 B2* | 1/2017 | Parkhideh | H02J 3/38 |
| 2003/0013948 A1* | 1/2003 | Russell | A61B 5/04282 600/372 |
| 2004/0125618 A1* | 7/2004 | De Rooij | H02J 1/102 363/17 |
| 2009/0236916 A1* | 9/2009 | Nishimura | H02J 7/35 307/80 |
| 2010/0001587 A1* | 1/2010 | Casey | H01L 31/02021 307/80 |
| 2010/0264732 A1* | 10/2010 | Beck | H02J 7/35 307/24 |
| 2012/0235481 A1* | 9/2012 | Nakashima | H01M 14/005 307/26 |
| 2016/0197482 A1 | 6/2016 | Varma et al. | |

OTHER PUBLICATIONS

International Search Report dated Oct. 2, 2013 for international application No. PCT/EP2013/058864.

\* cited by examiner

PHOTOVOLTAIC SYSTEM AND METHOD FOR OPERATING A PHOTOVOLTAIC SYSTEM FOR FEEDING ELECTRICAL POWER INTO A MEDIUM-VOLTAGE NETWORK

REFERENCE TO RELATED APPLICATIONS

This application is a continuation of international application number PCT/EP2013/058864 filed on Apr. 29, 2013, which claims priority to German application number 10 2012 104 005.2 filed on May 7, 2012.

FIELD

The disclosure relates to a method for operating a photovoltaic system comprising a photovoltaic generator comprising a plurality of photovoltaic modules, at least one inverter and at least one medium-voltage transformer for feeding electric power into a medium-voltage grid. The disclosure furthermore relates to a photovoltaic system designed for implementing the method.

BACKGROUND

In the case of relatively large photovoltaic systems, in particular solar parks, a feed of the generated electric power directly into a medium-voltage grid, for example a 20 kilovolt (kV) grid, is generally provided. Such solar parks generally have a multiplicity of photovoltaic modules, of which in each case a plurality are connected in series to form so-called strings. Often, a plurality of the strings are interconnected in order to supply the power generated by said strings in the form of direct current to one of possibly a plurality of inverters provided. On the output side, the inverters provided are connected to a primary circuit of a medium-voltage transformer. In this case, a medium-voltage transformer can be provided for each inverter, or a plurality of inverters can be connected to a medium-voltage transformer, possibly with separate primary windings. The generated power is fed, possibly via a coupling contactor, into the medium-voltage grid via the secondary-side output(s) of the transformer.

The article "Enel's 3-MW Power Station Preliminary Design", 10th European Photovoltaic Solar Energy Conference by C. Corvi et al. discloses a photovoltaic system of this type in which the inverters are connected directly to the medium-voltage transformers. In this case, inverters with inverter bridges which are provided with thyristors are used. The inverters are line-commutated, i.e. draw the switching voltage, also referred to as commutation voltage for the thyristors, from the power supply grid.

Owing to their relatively low degree of efficiency, nowadays inverters comprising inverter bridges provided with thyristors are now only rarely used. More customary is the use of switching transistors in the inverter bridges in order to be able to operate the inverter with pulse width modulation. In this case, usually IGBTs (Insulated Gate Bipolar Transistors) or MOSFETs (Metal-Oxide Semiconductor Field-Effect Transistors) are used as transistors. In order to provide protection against high voltages in the non-conducting direction, these transistors are generally protected by an antiparallel diode which is conducting in the non-conducting direction of the transistor and is often already integrated in the transistor. These diodes, also referred to as freewheeling diodes, form a full-wave rectifier from the grid connection to the DC link of the inverter. If an AC voltage is present at the inverter on the grid side, but there is insufficient voltage provided by the photovoltaic modules, a return current flow through the photovoltaic modules via the freewheeling diodes is established with power being withdrawn from the AC voltage grid.

In order to prevent such reverse currents caused by the design of the inverter, it is known to connect the inverters to the medium-voltage transformers in each case via a low-voltage AC contactor.

The low-voltage AC contactors are used in order to disconnect the inverter from the grid in the event of a lack of or insufficient insolation and thus to prevent a return current flow through the photovoltaic modules with a power withdrawal from the grid. Furthermore, the low-voltage AC contactors can be used in order to decouple the respective inverter selectively from the medium-voltage transformer in the event of an overcurrent or a short circuit, in the event of infringement of the required grid parameters (voltage, frequency, fed reactive power etc.) or in the event of failure of an inverter. The fact that each inverter is provided with an associated low-voltage AC contactor and a monitoring device for maintaining the grid feed parameters is involved and cost-intensive, however.

Furthermore, it is known to arrange an AC disconnecting element between a medium-voltage transformer and the energy supply grid, which AC disconnecting element acts as an AC-side protection element. For example, the article "Electrical Fault Protection for a Large Photovoltaic Power Plant Inverter", D. E. Collier and T. S. Key, Photovoltaics Specialists Conference, IEEE Conference Record, 1988, describes such a photovoltaic system, wherein in the case of the presence of various fault cases, the AC disconnecting element is actuated once a DC switching element has disconnected the inverter from the photovoltaic modules.

The article "Advanced, High-Reliability, System-Integrated 500-kW PV Inverter Development", R. West, Final Subcontract Report NREL/SR-520-43839, 2008, likewise describes a photovoltaic system in which a DC switching element is arranged between photovoltaic modules and an inverter, and an AC disconnecting element is provided between a medium-voltage transformer and the energy supply grid. In the event of a disconnection operation of the inverter, for example in the event of an excessively low insolation intensity, opening both of the DC switching element and of the AC disconnecting element takes place.

SUMMARY

Therefore, in one embodiment the present disclosure consists in providing a method for operating a photovoltaic system of the type mentioned at the outset for feeding electric power into a medium-voltage grid and a corresponding photovoltaic system is disclosed, in which disconnection of the photovoltaic modules from the grid and reverse current protection are achieved in a less complex manner.

In a method for operating a photovoltaic system for feeding a medium-voltage grid, the photovoltaic system has a photovoltaic generator comprising a plurality of photovoltaic modules, at least one inverter and at least one medium-voltage transformer. In this case, the medium-voltage transformer is connected on the primary side directly to a low-voltage AC output of the inverter, and the inverter is connected to the photovoltaic generator via a DC input, wherein the inverter, depending on its design, permits reverse currents from the low-voltage AC output to the DC input. The method is characterized by the fact that in the event that there is insufficient generation of electric power for the feed by the photovoltaic modules of the photovoltaic system, the inverter remains connected on the AC side to the medium-voltage grid via the medium-voltage transformer, and the inverter remains connected on the DC side to the photovoltaic generator.

By virtue of the fact that the medium-voltage transformer is connected directly to the inverter, there is no need for the cost-intensive primary-side low-voltage AC contactor between the inverter and the medium-voltage transformer. Owing to the fact that the inverter remains connected to the photovoltaic generator on the DC side, it is possible to dispense with a DC voltage switching element between the photovoltaic generator and the inverter or for a switching element to be used which does not need to be designed for a high number of switching cycles. The method according to the disclosure is based on the knowledge that AC-side and DC-side disconnection, contrary to conventional practice, can be omitted since a forward voltage of the plurality of photovoltaic modules, which are generally connected in series, is greater in modern-day photovoltaic systems than a voltage which is set at the DC input owing to the reverse currents.

In one configuration of the method, the photovoltaic system is isolated on the secondary side of the medium-voltage transformer from the medium-voltage grid with the aid of a coupling contactor, which is arranged between the medium-voltage transformer and the medium-voltage grid, when preset grid parameters are not met.

In particular in the case of relatively large systems comprising a plurality of inverters, this results in an advantage since, for each inverter, a low-voltage AC contactor can be saved, but only a common coupling contactor for all inverters is required.

A photovoltaic system according to the disclosure has a photovoltaic generator comprising a plurality of photovoltaic modules, at least one inverter and at least one medium-voltage transformer. In this case, the medium-voltage transformer is connected on the primary side directly to a low-voltage AC output of the inverter and the inverter is connected to the photovoltaic generator via a DC input. Depending on its design, the inverter permits reverse currents from the low-voltage AC output to the DC input. The photovoltaic system is characterized by the fact that such a large number of photovoltaic modules is connected in series within the photovoltaic generator that a forward voltage of the series-connected photovoltaic modules is greater than a voltage set at the DC input owing to the reverse currents, and the fact that the photovoltaic system is designed for implementing the abovementioned method. The advantages resulting correspond to those of the method.

BRIEF DESCRIPTION OF THE DRAWINGS

The disclosure will be explained in more detail below with reference to an exemplary embodiment with the aid of three figures, in which.

DETAILED DESCRIPTION

Figure 1:
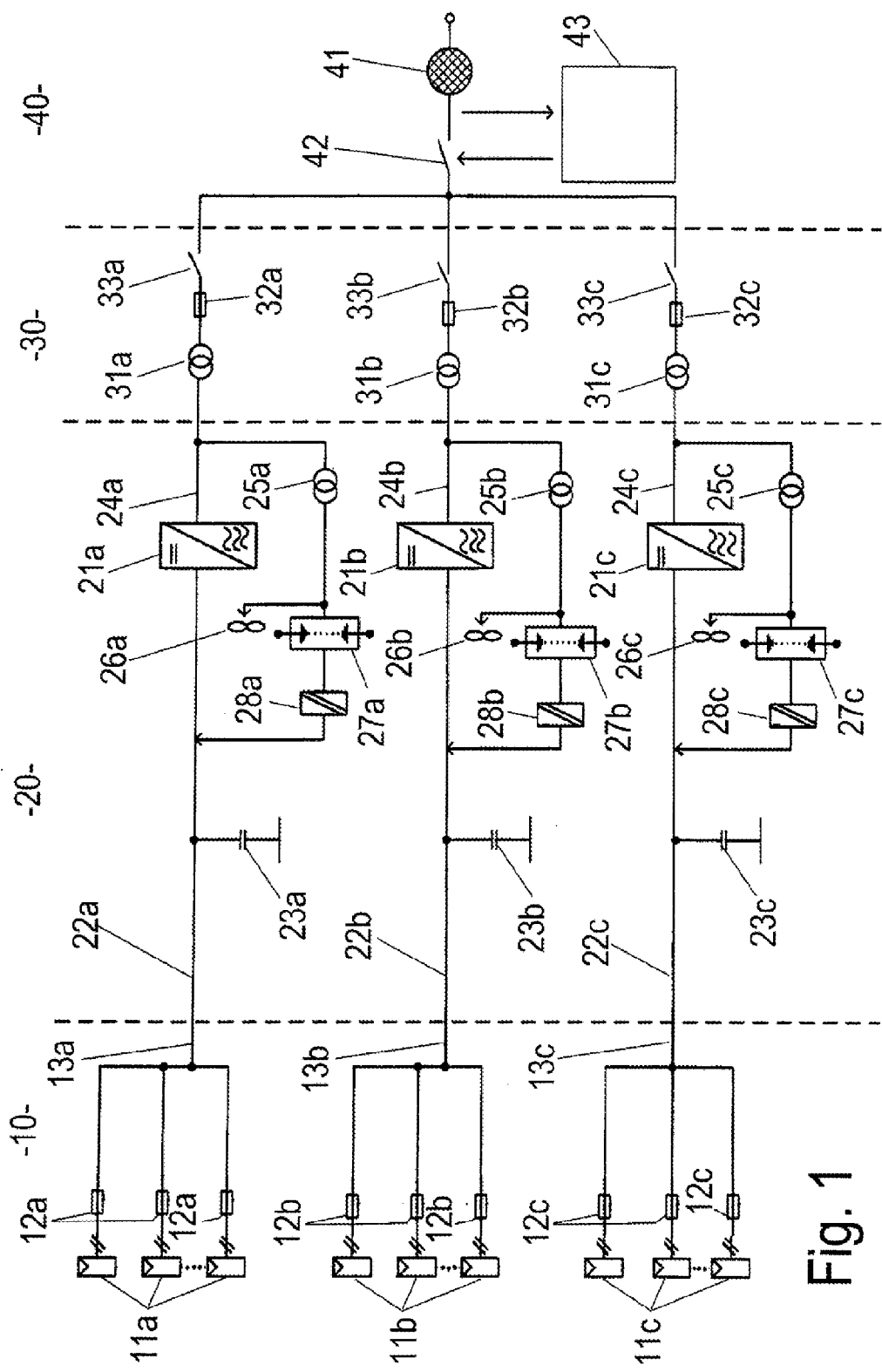
FIG. 1 shows a photovoltaic system for connection to a medium-voltage grid.

The photovoltaic system illustrated in FIG. 1 is divided schematically into four sections: a photovoltaic generator 10, an inverter arrangement 20, medium-voltage components 30 and a section for grid connection 40.

In one embodiment the section for grid connection 40 is simply contained in the photovoltaic system. The remaining sections 10, 20, 30 each have a plurality of, for example three in FIG. 1, independent branches which each have an identical design. In FIG. 1, the components of the individual branches a, b, c are distinguished from one another by a suffix a, b or c appended to the respective reference symbol of the components. If a reference symbol is used without such a suffix below, this relates either to all of the corresponding components together or to a component which is not specified in any greater detail, wherein the assignment to one of the branches is inconsequential. The number of three branches of the photovoltaic system is in this case purely by way of example and is not restrictive. The disclosure can be used for photovoltaic systems having any desired number of branches.

The photovoltaic generator 10 has a multiplicity of photovoltaic modules 11, of which in each case a plurality can be interconnected to form a subgenerator. For this purpose, a plurality of photovoltaic modules 11 are connected in series, for example, to form strings. One or more strings, possibly connected in parallel, can form the subgenerator. In each case such a large number of photovoltaic modules 11 is connected in series in each subgenerator that a forward voltage of the series-connected photovoltaic modules 11 is greater than a voltage set across the medium-voltage components 30 and the inverter arrangement 20 owing to possible reverse currents from the grid connection 40.

Only one photovoltaic module 11 is illustrated per subgenerator symbolically in the figure. A DC (direct current) fuse element 12 is assigned to each subgenerator, for example a so-called string fuse. For example, a slow fusible link which disconnects both in the event of an overcurrent and in the event of a short circuit can be used as fuse element 12.

All of the subgenerators in a branch a, b or c are connected to one another in parallel at an output 13a, b, c of the branch. FIG. 1 illustrates three subgenerators per branch, by way of example. This number is also not restrictive. As indicated by the ellipsis in the figure, generally a much greater number of subgenerators per branch is provided. The mentioned circuitry for the individual photovoltaic modules 11 to form strings and the parallel connection thereof to form subgenerators is also purely by way of example. Other combinations of series and/or parallel circuits of the photovoltaic modules 11 by means of which the generated power of the photovoltaic modules 11 is combined at in each case one output 13 per branch are likewise conceivable.

In addition, provision can be made for a switching element, for example a contactor, to be assigned to each subgenerator or else to a group of interconnected subgenerators. The switching element can be used for disconnecting individual subgenerators or all of the subgenerators from the corresponding output 13, for example in risk cases or for maintenance purposes or in fault cases. The observation is made that such a switching element is not used, however, for regular disconnection of the photovoltaic generator from the inverter, for example owing to insufficient insolation. Therefore, it does not need to be designed for a high number of switching cycles either.

Within the inverter arrangement 20, each branch a, b, c has an inverter 21 having a DC input 22, which is connected to the respective output 13 a, b, c of the photovoltaic generator 10. The input circuit of an inverter is also referred to as DC link. Correspondingly, the voltage present at the DC input 22 is also referred to as DC-link voltage Uz. Typically, the DC-link voltage Uz is at the optimum working point at which the respective part of the photovoltaic generator 10 outputs a maximum electric power under (present) operating conditions, at approximately 500-1000 V. The DC link is subjected to pulsed loading by the inverter 21. In order to smooth the DC-link voltage Uz and to maintain the optimum working point, a DC-link capacitor 23 is provided, which provides a DC-link capacitance. FIG. 1 illustrates the DC-link capacitor 23 separately, but it is often integrated in the inverter.

Furthermore, an auxiliary transformer 25, auxiliary components 26, a buffer battery 27 and a precharging device 28 are also provided in each of the branches within the inverter arrangement 20. The auxiliary transformer 25 is used for the power supply to the auxiliary components 26. Typically, the auxiliary components are supplied with direct current. A corresponding rectifier and regulating circuit is not illustrated for reasons of simplicity. For example, a fan is illustrated as auxiliary component 26 in the figure. Further auxiliary components are monitoring devices and devices for controlling the respective inverter 21 and for data acquisition and long-distance data transmission. Furthermore, the voltage stepped down by the auxiliary transformer 25 is used for charging or for maintaining the charge of the buffer battery 27. This function of the buffer battery 27 and the precharging device 28 are explained in more detail further below.

Each of the inverters 21 has an AC output 24, which is connected, generally with three phases, directly to a primary side of a medium-voltage transformer 31 for the feed into a medium-voltage grid 41. Directly in this case means in particular that no switching element which can be actuated or can close automatically is provided between the inverter 21 and the medium-voltage transformer 31. A connection with, interposed, a fuse, a disconnector or another protection element which can disconnect automatically but cannot switch on again is intended to be included by the term directly within the scope of the application, on the other hand. In the case of a photovoltaic system in accordance with the application, therefore, no switching element which is suitable for the regular and non-manual disconnection of the medium-voltage transformer from and reconnection of the medium-voltage transformer to the inverter is provided on the primary side (i.e. the low-voltage side) between the inverter and the medium-voltage transformer. A disconnecting, protection or fuse element which opens on the basis of a fault or can be opened manually, for example for maintenance purposes, and can be closed again manually can be provided, on the other hand.

It is assumed that the inverters 21 have inverter bridges comprising transistors, for example comprising IGBTs or MOSFETs, which are protected from excessively high off-state voltages by antiparallel freewheeling diodes. These freewheeling diodes form a full-wave rectifier for an AC voltage present at the AC outputs 24. The inverters 21 are additionally self-commutating; the commutation is performed by switching-off and switching-on of the transistors used as switches.

In the example shown, precisely one medium-voltage transformer 31a, b, c is provided for each inverter 21a, b, c. However, it is also conceivable for two or more inverters to lead to a medium-voltage transformer, which may be provided with a plurality of primary windings.

In one embodiment the power of the medium-voltage transformer 31 is in the range of from 1 to 1.5 megavolt-amperes (MVA). This corresponds to currents in the DC link which can still be transmitted with acceptable line cross sections without excessively high $I^2R$ losses in the case of the abovementioned DC-link voltage of 500-1000 V. At the same time, the mentioned power range makes it possible to construct a solar park without the number of parallel branches, each having a dedicated inverter 21 and medium-voltage transformer 31, becoming too great and therefore the design becoming uneconomical.

A fuse element 32 and a load break switch 33 are assigned to each medium-voltage transformer 31 and are connected in series with the respective secondary winding of the medium-voltage transformers 31.

By way of example, a slow fusible link which disconnects both in the case of an overcurrent and in the event of a short circuit can be used as fuse element 32. If precisely one inverter is assigned to each medium-voltage transformer, as in the example illustrated, the fuse element 32 protects both the medium-voltage transformer and the inverter from overcurrents.

In one embodiment a spring-operated disconnector with manual windup and electromagnetic tripping is used as load break switch 33. The tripping mechanism is in this case connected to a fault monitoring device of the respective inverter 21, with the result that the load break switch 33 automatically disconnects the corresponding branch selectively from the medium-voltage grid 41 in the event of a fault. If required, for example for maintenance work, it can naturally also be disconnected manually. A spring-operated disconnector with manual windup is in this case sufficient and, for cost reasons, preferred to motor-operated windup, in particular since the load break switch 33 is not activated during normal operation of the photovoltaic system, as is set forth in more detail further below.

In order to feed the electric power generated into the medium-voltage grid 41, the secondary circuits safeguarded individually by the fuse elements 32 and the load break switches 33 are connected jointly to the medium-voltage grid 41 via a coupling contactor 42. The coupling contactor 42 is actuated by a monitoring device 43, which checks whether tolerance limits prescribed for the medium-voltage grid 41 for parameters such as voltage amplitude, phase angle, reactive power, frequency etc. are being maintained. If one of these parameters leaves the prescribed tolerance range, the photovoltaic system is disconnected from the medium-voltage grid 41 by the coupling contactor 42.

Methods for operating a photovoltaic system are described below with reference to flowcharts in FIGS. 2 and 3. The methods can be implemented, for example, in connection with a photovoltaic system in accordance with the example embodiment illustrated in FIG. 1. Reference symbols used relate to FIG. 1.

Figure 2:
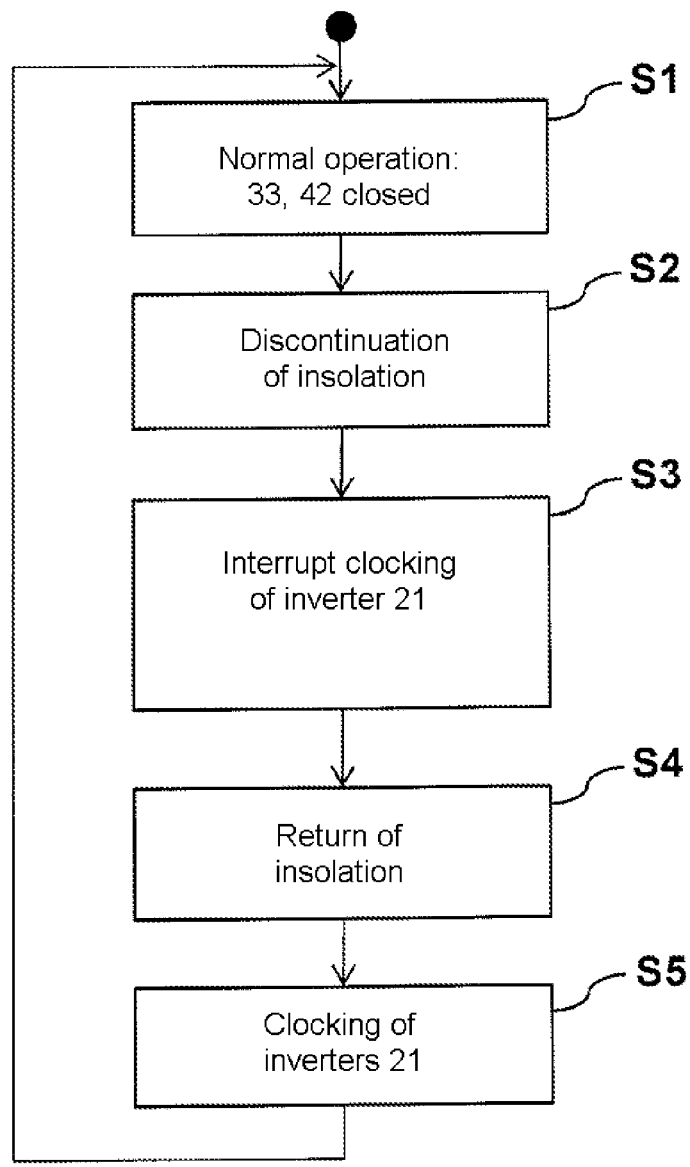
FIG. 2 shows a flowchart of an example embodiment of a method for operating a photovoltaic system.

First, the photovoltaic system is operated in a normal operating mode at S1 (FIG. 2). In this case, the photovoltaic modules 11 in the region of the photovoltaic generator 10 generate sufficient electrical energy for the feed into the medium-voltage grid 41 by virtue of sufficient insolation.

In the normal operating mode, the inverters 21 are clocked in order to convert electric power from DC to AC. The DC link is operated at an optimum working point voltage. Generally, means for setting and tracking the optimum working point are provided in the respective inverter 21 (MPP Tracking—Maximum Power Point Tracking). The DC-link capacitor 23 is charged corresponding to the voltage Uz in the DC link. Furthermore, both the load break switch 33 in the individual branches a, b, c of the photovoltaic system and the common coupling contactor 42 are closed, with the result that all of the inverters 21 feed into the medium-voltage grid 41 via the corresponding medium-voltage transformers 31.

At the AC output 24 of each inverter 21, power is withdrawn by the auxiliary transformer 25, and this power is used to supply the auxiliary components 26. The voltage provided by the auxiliary transformer 25 is also used for charging or for maintaining the charge of the buffer battery 27. The precharging device 28 is not active during normal operation.

If the electric power generated by the photovoltaic modules 11 is no longer sufficient for a feed into the medium-voltage grid 41, for example at night or in the case of complete shading (act S2), in a subsequent act S3 the photovoltaic modules 11 in the various branches a, b, c remain connected to the respective inverters 21. The load break switches 33 and the coupling contactor 42 remain closed, with the result that all of the inverters 21 are coupled with their respective AC output 24 to the medium-voltage grid 41 indirectly via the medium-voltage transformers 31. The inverters 21 are not clocked in this case.

In this case, the auxiliary components 26 are supplied energy by the medium-voltage grid 41 via the auxiliary transformer 25. The DC-link voltage Uz is initially maintained owing to the DC-link capacitance of the DC-link capacitor 23. Since the working voltage in the DC link is generally greater than the peak voltage of the AC voltage present at the AC output 24 of the inverter 21, the DC-link voltage Uz is reduced with a time constant in the minutes range to this peak value of the AC voltage. As previously mentioned in connection with FIG. 1, the number of series-connected photovoltaic modules 11 within each subgenerator is selected in such a way that the forward voltage of the series-connected photovoltaic modules 11 is greater than this peak value of the AC voltage. Although disconnection does not take place either on the AC side or on the DC side, the photovoltaic modules 11 are not damaged.

If, once the insolation is reinstated (at S4), power is again provided by the photovoltaic modules 11, clocking of the inverters 21 begins at S5 and set a desired DC voltage setpoint value in the respective DC links. Therefore, the photovoltaic system is again in the normal operating mode.

Figure 3:
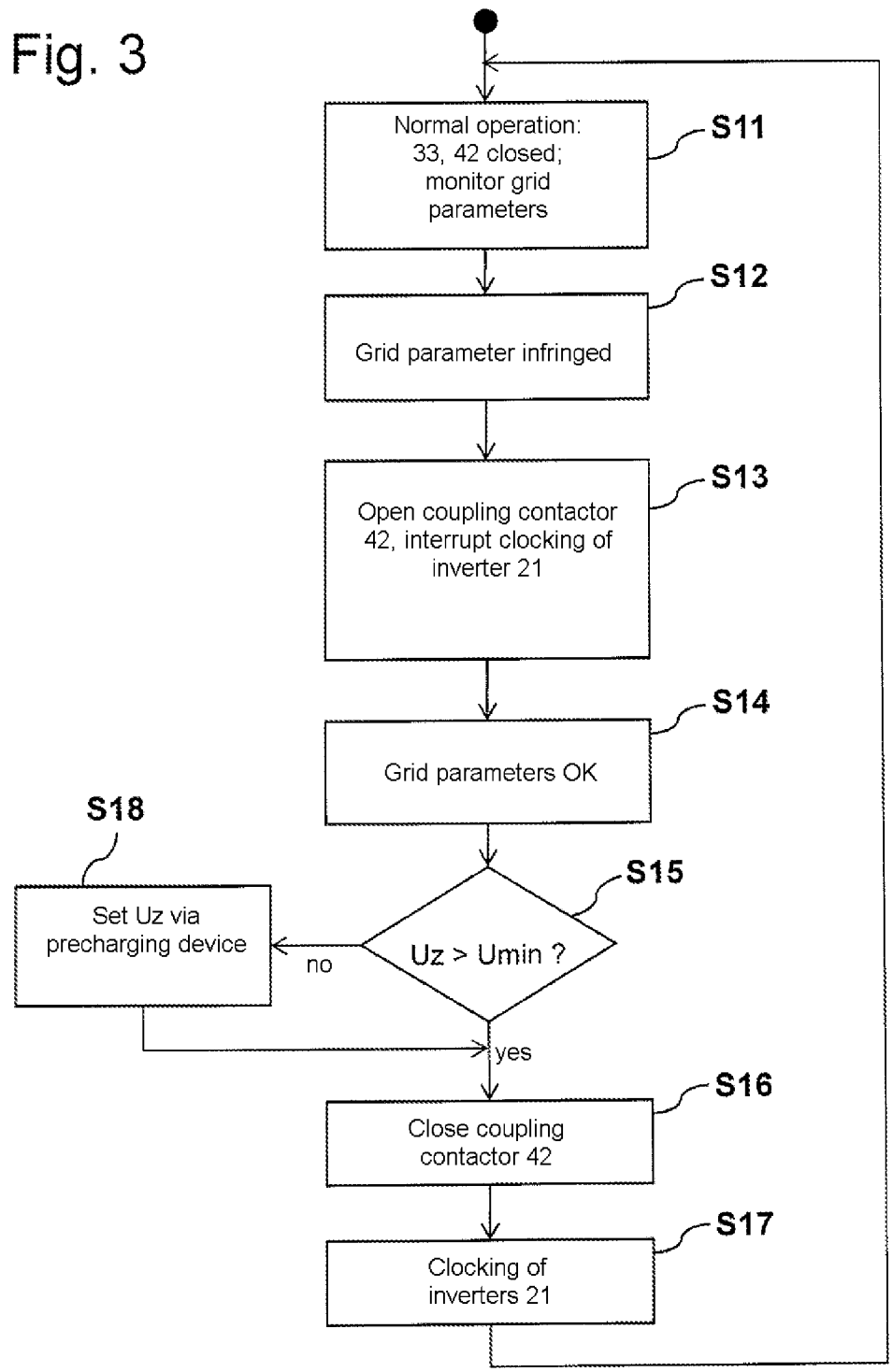
FIG. 3 shows a flowchart of a further example embodiment of a method for operating a photovoltaic system.

A development of the method for operating a photovoltaic system is illustrated in FIG. 3. During normal operation, at S11, the monitoring device 43 monitors whether relevant grid parameters at the point of feed of the generated current into the medium-voltage grid 41 corresponds to the presets by the grid operators, for example with respect to the voltage, frequency or fed reactive power.

If one or more of these parameters leaves the prescribed tolerance range at S12, the monitoring device 43 opens the coupling contactor 42 at S13. When the coupling contactor 42 is open, the DC-link voltage increases in the direction of the open-circuit no-load voltage of the photovoltaic modules 11. It is then necessary to ensure that such a high voltage as the open-circuit voltage of the photovoltaic modules 11 can be applied, at least temporarily, to the inverter.

If it is established by the monitoring device 43 that the grid feed parameters are again within the tolerance range (act S14), a check is first performed at S15 to ascertain whether the DC-link voltages Uz are each above a preset minimum voltage Umin. The minimum voltage Umin can be, for example, within the range of 30% to 70% of the DC-link voltage during operation. If the interruption time during which the coupling contactor 42 was open was short, for example shorter than one minute, the DC-link voltages have not yet fallen below the minimum voltage Umin owing to the capacitance of the DC-link capacitors 23.

If, at S15, it has been established that the respective DC-link voltage Uz is above the minimum voltage Umin and the interruption time was therefore not excessively long, the coupling contactor 42 is switched on again at S16 without there being a risk of high reverse currents via the medium-voltage transformers 31 and the inverters 21 into the DC-link capacitors 23. Once the coupling contactor 42 has been switched on again, in a subsequent act S17 the inverters 21 are clocked again in order to bring the DC-link voltage to the desired setpoint value.

If the opening time of the coupling contactor 42 has lasted too long, however, and the voltage Uz in the DC links has fallen below the minimum voltage Umin, overcurrents could not be ruled out in the case of the coupling contactor 42 being switched on again directly. In this case, at S18, the DC-link capacitors 23 are first precharged via the corresponding precharging devices 28 from the respective buffer battery 27 to a preset setpoint value which is greater than or equal to the minimum voltage Umin. Afterwards the method is continued at S16 and S17, in which, as described previously, the coupling contactor 42 is closed and clocking of the inverters 21 resumes. The precharging device can be realized by a step-up converter, for example. In addition, galvanic isolation between the DC link and the buffer battery 27 can be provided in the precharging device.

As an alternative to the design shown in FIG. 1, precharging of the DC links can also take place from a central buffer battery. The supply to the auxiliary components 26 in this case also takes place correspondingly from the central buffer battery. In order to minimize $I^2R$ losses in the current distribution in the case of such a central buffer battery, said buffer battery can have a relatively high voltage of 110 V, for example. For the local buffer batteries 27, on the other hand, lower voltages are preferred, for example 24 V. If appropriate, a central precharging device which can be switched onto the corresponding DC links as required can also be provided.

For maintenance work or in the case of the necessity to replace one of the inverters 21 or one of the medium-voltage transformers 31, the corresponding branch of the photovoltaic system is decoupled via the assigned load break switch 33. As described previously, in the case of an electromagnetically tripped load break switch 33, this decoupling can also take place by means of a fault monitoring device of the respective inverter 21. Since the events which result in actuation of the load break switches 33 by their very nature should be rare, a spring-operated disconnector with manual windup can be used as load break switch 33.

Restart of a branch of the photovoltaic system which has been decoupled in such a way via the load break switch 33 is performed in a similar way to the reconnection of the photovoltaic system via the coupling contactor 42, as previously described. Correspondingly, therefore, the DC-link capacitor 23 is charged via the precharging device 28 prior to a respective disconnected load break switch 33 being switched on again.

Since the occurrence of impermissible grid feed parameters is not a rare event, the coupling contactor 42 is, in one embodiment, designed for frequent and fault-free implementation of many, for example, more than 20,000 switching cycles. The coupling contactor 42 can of course be used for other purposes in addition to the purposes described above, for example for complete disconnection of the photovoltaic system from the grid for maintenance purposes. The coupling contactor 42 in accordance with the application differs from known system disconnectors apart from its intended use within the scope of the methods according to the disclosure in terms of its capability to be switched regularly.

The invention claimed is:

1. A method for operating a photovoltaic system for feeding a medium-voltage grid, wherein the photovoltaic system has a photovoltaic generator comprising a plurality of photovoltaic modules connected in series, at least one inverter and at least one medium-voltage transformer, and wherein the medium-voltage transformer is connected on the primary side directly to a low-voltage AC output of the inverter, the inverter is connected to the photovoltaic generator via a DC input, and the inverter permits reverse currents from the low-voltage AC output to the DC input, comprising:
   determining whether there is insufficient generation of electric power by the photovoltaic modules for feeding to the medium-voltage grid;
   maintaining a connection between an AC side of the inverter and the medium-voltage grid via the medium-voltage transformer when insufficient electric power generation is determined; and
   maintaining a connection between a DC side of the inverter and the photovoltaic generator when insufficient electric power generation is determined,
   wherein a number of the plurality of photovoltaic modules connected in series within the photovoltaic generator is sufficiently large so that a forward voltage of the plurality of series-connected photovoltaic modules is greater than a voltage set at the DC input owing to the reverse currents.

2. The method according to claim 1, further comprising a coupling contactor, arranged between the medium-voltage transformer and the medium-voltage grid, wherein the coupling contactor is configured to isolate the photovoltaic system on the secondary side of the medium-voltage transformer from the medium-voltage, in a case that preset requirements for grid feed parameters are not met.

3. The method according to claim 2, wherein the grid feed parameters comprise a voltage amplitude and/or a frequency of the medium-voltage grid and/or a fed reactive power.

4. A photovoltaic system, comprising:
   a photovoltaic generator comprising a plurality of photovoltaic modules;
   at least one inverter; and
   at least one medium-voltage transformer, wherein the at least one medium-voltage transformer is connected on a primary side thereof directly to a low-voltage AC output of the inverter,
   wherein the at least one inverter is connected to the photovoltaic generator via a DC input, and
   wherein the at least one inverter permits reverse currents from the low-voltage AC output to the DC input,
   wherein a number of photovoltaic modules connected in series within the photovoltaic generator is sufficiently large so that a forward voltage of the series-connected photovoltaic modules is greater than a voltage set at the DC input owing to the reverse currents.

5. The photovoltaic system according to claim 4, wherein no switching element which can close by actuation or automatically is provided in the connection between the medium-voltage transformer and the low-voltage AC output of the inverter.

6. The photovoltaic system according to claim 4, wherein no switching element which can open and close by actuation or automatically is provided in the connection between the photovoltaic generator and the DC input of the inverter.

7. The photovoltaic system according to claim 4, wherein the at least one inverter comprises a bridge having switching transistors.

8. The photovoltaic system according to claim 7, wherein the inverter bridges have freewheeling diodes, which are arranged back-to-back in parallel with respect to the switching resistors of the inverter bridges.

9. The photovoltaic system according to claim 4, further comprising a coupling contactor arranged in the connection between the medium-voltage transformer and the medium-voltage grid.

10. The photovoltaic system according to claim 9, wherein the at least one medium-voltage transformer comprises at least two medium-voltage transformers connected to one another on a secondary side upstream of the coupling contactor in a direction of energy flow during feeding, with the result that the coupling contactor, in the event of a switching operation, disconnects the at least two medium-voltage transformers jointly from the medium-voltage grid or connects said transformers thereto.

11. The photovoltaic system according to claim 4, further comprising a monitoring device configured to check grid feed parameters of the current generated by the photovoltaic system connected to the coupling contactor and configured to interact therewith.

12. The photovoltaic system according to claim 4, further comprising a fuse element provided on a secondary side of each of the at least one medium-voltage transformer.

13. The photovoltaic system according to claim 4, further comprising a load break switch provided on a secondary side for each of the at least one medium-voltage transformer.

14. The photovoltaic system according to claim 13, wherein the load break switch is a spring-operated disconnector.

15. The photovoltaic system according to claim 9, wherein the coupling contactor is configured to withstand more than 20,000 switching operations.

16. The photovoltaic system according to claim 4, wherein the at least one inverter is configured to operate at powers greater than 100 kW.

17. The photovoltaic system according to claim 4, further comprising a precharging device configured to apply a preset voltage to a DC link at a DC input of the inverter.

18. The photovoltaic system according to claim 17, further comprising a buffer battery configured to supply power to the precharging device during a disconnection of the photovoltaic system from the medium-voltage grid.

* * * * *